(12) United States Patent
Calder et al.

(10) Patent No.: US 8,294,059 B2
(45) Date of Patent: Oct. 23, 2012

(54) PROCESS FOR PRODUCING THROUGH-HOLES IN SHEET MEMBERS

(75) Inventors: David P. Calder, Baltimore, MD (US); Graham Howarth, Baltimore, MD (US)

(73) Assignee: MRA Systems, Inc., Baltimore, MD (US)

( * ) Notice: Subject to any disclaimer, the term of this patent is extended or adjusted under 35 U.S.C. 154(b) by 899 days.

(21) Appl. No.: 12/323,597

(22) Filed: Nov. 26, 2008

(65) Prior Publication Data

US 2010/0126971 A1   May 27, 2010

(51) Int. Cl.
 *B23K 15/00* (2006.01)
 *B23P 11/00* (2006.01)

(52) U.S. Cl. ............... 219/121.2; 219/121.35; 181/292; 181/293

(58) Field of Classification Search .. 219/121.18–121.2, 219/121.28, 121.31, 121.7, 121.71; 181/292, 181/293
See application file for complete search history.

(56) References Cited

U.S. PATENT DOCUMENTS

| | | | | |
|---|---|---|---|---|
| 3,933,327 A | * | 1/1976 | Cook et al. | 244/134 B |
| 4,377,736 A | * | 3/1983 | Daunt et al. | 219/121.68 |
| 4,390,032 A | * | 6/1983 | Labbe et al. | 131/281 |
| 4,965,430 A | * | 10/1990 | Curtis et al. | 219/121.69 |
| 5,246,530 A | * | 9/1993 | Bugle et al. | 216/56 |
| 6,144,007 A | * | 11/2000 | Levin | 219/121.62 |
| 6,358,590 B1 | * | 3/2002 | Blair et al. | 428/73 |
| 2007/0069086 A1 | * | 3/2007 | Ponder et al. | 248/127 |

* cited by examiner

*Primary Examiner* — Samuel M Heinrich
(74) *Attorney, Agent, or Firm* — John Colligan; Gary M. Hartman; Domenica N. S. Hartman

(57) ABSTRACT

A process for producing through-holes in a sheet member to form a perforated article, such as an arcuate (non-planar) acoustic skin suitable for use in an acoustic panel of an aircraft engine nacelle. The process includes deforming a sheet member to have an arcuate shape with an arcuate surface, mounting and rotating the arcuate-shaped sheet member on a mandrel and then, while rotating the sheet member, directing an electron beam at the arcuate surface of the sheet member and deflecting the electron beam toward multiple locations on the arcuate surface to produce the through-holes through the sheet member in a defined hole pattern and thereby yield a perforated arcuate-shaped sheet member with holes having axes substantially normal to the arcuate surface. The holes are not subjected to elongation in a nonuniform manner after they are produced, and have the same transverse cross-sectional shape.

19 Claims, 3 Drawing Sheets

PROCESS FOR PRODUCING THROUGH-HOLES IN SHEET MEMBERS

BACKGROUND OF THE INVENTION

The present invention generally relates to processes for producing perforated articles, and more particularly to a process for forming numerous holes in a curved panel suitable for use in an acoustic panel, such as of the type used in nacelles of gas turbine engines.

A typical construction used in aircraft engine nacelle components (for example, the engine inlet, thrust reversers, core cowl, and transcowl) and other aerostructures such as acoustic panels is a sandwich-type layered structure comprising a core material between thinner top and bottom sheets or skins. The core material is typically a lightweight material, often a foam or honeycomb metallic or composite material. A variety of metallic and composite materials can also be used for the skins, with common materials including aluminum alloys.

Nacelle fan duct flow surfaces typically include acoustic panels to suppress noise. A common form of acoustic panel comprises a contoured sheet/skin (sometimes referred to as a face sheet or acoustic skin) that faces the duct airflow, a backing sheet/skin, and an open-cell foam or honeycomb core therebetween. The acoustic skin is acoustically treated by forming numerous small through-holes that help to suppress noise by channeling pressure waves associated with sound into the open cells within the core, where the energy of the waves is dissipated through friction (conversion to heat), pressure losses, and cancellation by reflection of the waves from the backing skin. For some gas turbine engine applications, perforations on the order of about 0.03 to about 0.06 inch (about 0.75 to about 1.5 mm) in diameter and hole-to-hole spacings of about 0.06 to about 0.12 inch (about 1.5 to about 3 mm) are typical, resulting in acoustic hole patterns containing seventy-five holes or more per square inch (about twelve holes or more per square centimeter) of treated surface. Given the large number of holes necessary to acoustically treat airflow surfaces of acoustic panels, rapid and economical methods for producing the holes are desirable.

A process currently employed to produce acoustic skins is to perforate a flat aluminum sheet stock, such as by punching, to have the desired acoustic hole pattern, after which the sheet stock is formed to produce the arcuate shape required for the nacelle. Multiple heat treatments and forming steps are typically performed to reduce the likelihood of tearing the sheet stock during forming. During forming, the holes tend to elongate, often in a nonuniform manner such that the holes do not consistently have the same cross-sectional shape. While likely acceptable and adequate for many applications, an acoustic skin with nonuniform holes or a nonuniform hole pattern is likely to have unpredictable sound absorption performance that does not meet design requirements for more demanding applications. Other problems arise as a result of the holes often being punched in large sheet stock, which must be of sufficient size for the intended nacelle. The holes are typically punched over the full surface of the sheet, except for a small border along the edges of the sheet stock. As a result of the forming operation, holes may be present where none are desired for structural reasons. Though this problem can be solved by the use of doublers and reinforcements to maintain structural integrity, the solution comes with weight, part count, and cost penalties.

Another common process for producing acoustic hole patterns is to mechanically drill the holes in the surface of the acoustic skin after it has been formed. While this method overcomes the problems associated with fabricating acoustic skins from pre-perforated sheets, it requires the use of special tooling and machinery to place the holes in the proper orientation on the contoured non-planar skin. Though special-purpose machines designed to drill specific parts may be capable of as many as twenty-five holes per second, state-of-the-art mechanical drilling machines are typically limited to drilling about four holes per second. In addition to speed limitations, mechanical drilling processes tend to be expensive due to the special tooling and machinery required.

A more recent method for producing acoustic hole patterns is to employ an electron beam drilling technique, as reported in U.S. Pat. No. 6,358,590 to Blair et al. Face sheets (acoustic skins) with holes having diameters and spacings of up to 0.020 inch and 0.11 inch, respectively, are disclosed. Furthermore, Blair et al. teach that a decreasing hole diameter (in the direction toward the skin surface) is necessary. It appears unclear as to whether Blair et al. drill the face sheet before or after forming. Blair et al. also do not describe the fixturing for the face sheet during drilling, other than that a backing sheet is used.

BRIEF DESCRIPTION OF THE INVENTION

The present invention provides a process for producing multiple through-holes in a sheet member to form a perforated article, such as an arcuate (non-planar) acoustic skin suitable for use in an acoustic panel of an aircraft engine nacelle.

According to one aspect of the invention, the process includes deforming a sheet member to have an arcuate shape with an arcuate surface, mounting and rotating the arcuate-shaped sheet member on a mandrel and then, while rotating the arcuate-shaped sheet member, directing an electron beam at the arcuate surface of the rotating arcuate-shaped sheet member and deflecting the electron beam toward multiple locations on the arcuate surface to produce the multiple through-holes through the arcuate-shaped sheet member in a defined hole pattern and thereby yield a perforated arcuate-shaped sheet member with holes having axes substantially normal to the arcuate surface.

Significant advantages of this invention include the ability to controllably and consistently produce holes with the same cross-sectional shape, which may be a circular, elliptical, or slot shape transverse to the axis of each hole. Holes with various longitudinal cross-sections can also be generated, such as rectilinear, tapered, bell, and hourglass shapes. In addition, very small holes of consistent size, for example, as small as about 0.001 inch (about 25 micrometers), can be economically produced. Another advantage is the ability to rapidly drill small holes in a contoured surface at very high rates, for example, rates as high as about two hundred holes per second, depending on the diameter, spacing, and geometry of the holes.

Other aspects and advantages of this invention will be better appreciated from the following detailed description.

DETAILED DESCRIPTION OF THE INVENTION

Figure 1:
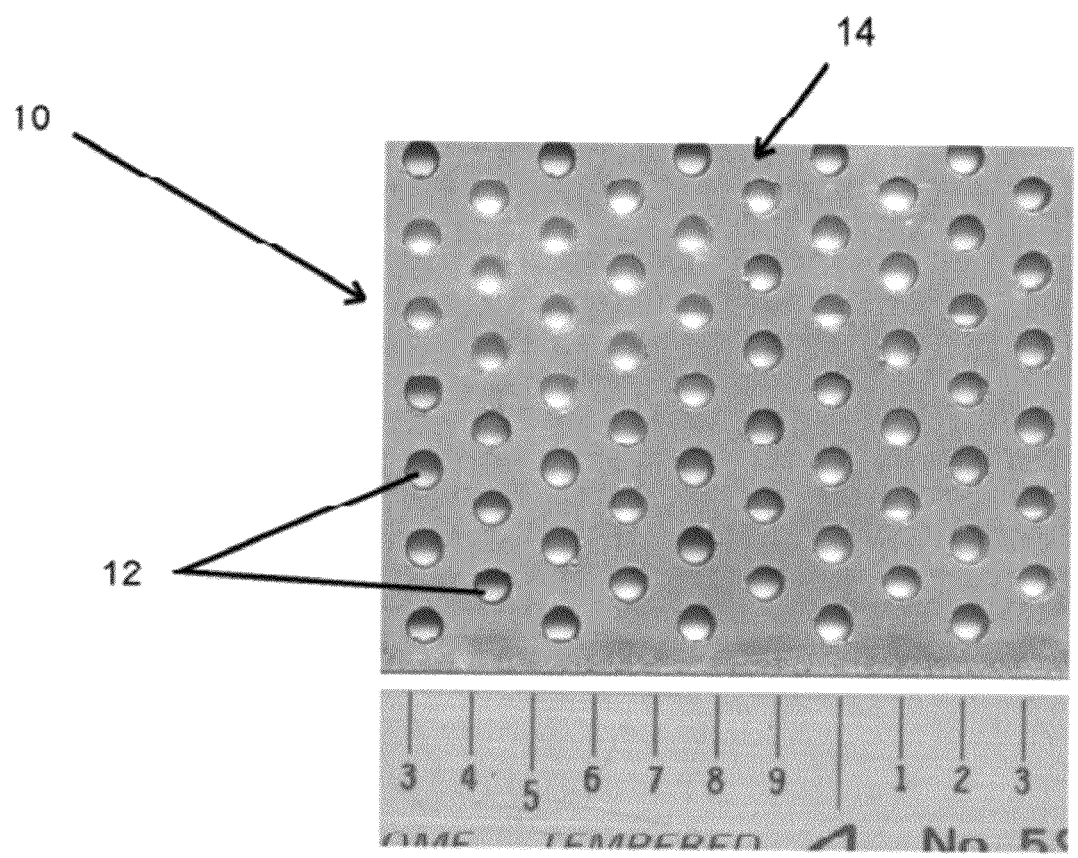
FIG. 1 is a scanned image of a section of an aluminum acoustic skin for an aircraft engine nacelle, in which holes were produced in accordance with an embodiment of this invention.
Figure 2:
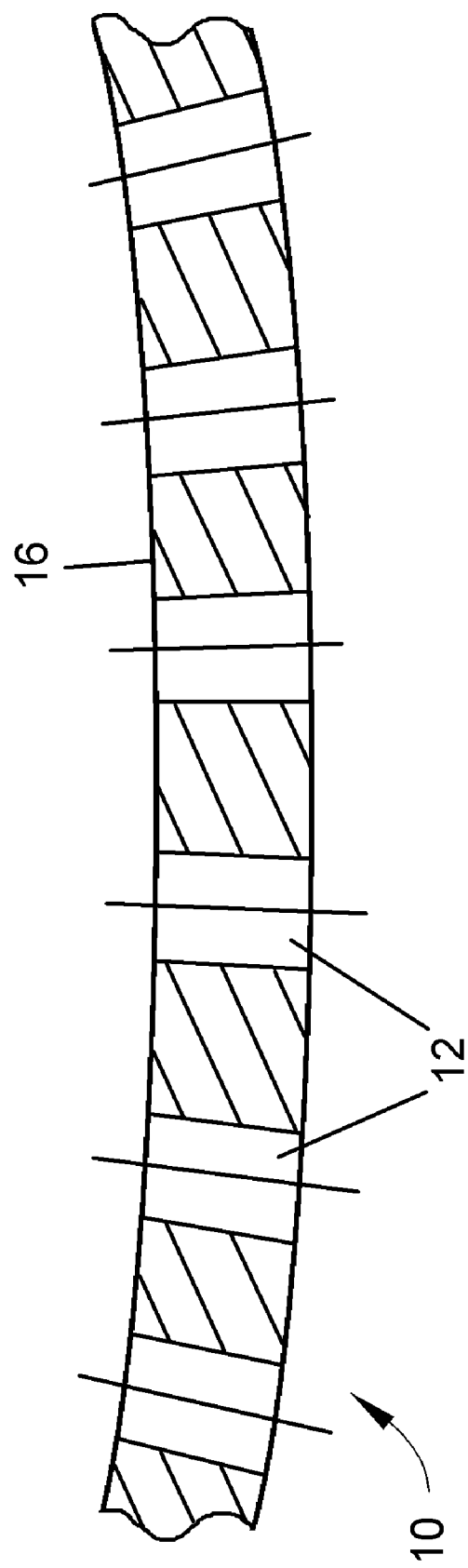
FIG. 2 schematically represents a cross-section through the acoustic skin of FIG. 1.

FIG. 1 shows a region of an acoustic sheet or skin 10 of a type intended to face the airflow through an aircraft engine nacelle. The skin 10 was produced by processing steps of this invention to have a well-defined pattern 14 of small, equi-spaced perforations or holes 12 on a curved surface 16 of the skin 10, as represented in FIG. 2. The skin 10 may be formed from a variety of materials, a notable example being an aluminum alloy, though the use of other materials is also foreseeable and within the scope of this invention. Particular applications of interest to the invention include, but are not limited to, thrust reverser core cowl skins and duct sidewall skins of high-bypass turbofan engines, such as the General Electric CF34-10. While the invention will be described in reference to the use of the skin 10 in an acoustic panel of an aircraft engine, it should be understood that the invention is applicable to a variety of components having contoured (non-planar) surfaces in which numerous small holes are to be formed.

As represented in FIG. 2, the holes 12 extend entirely through the skin 10, which has a typical thickness of about 0.038 to about 0.045 inch (about 0.95 to about 1.15 mm), though lesser and greater thicknesses are foreseeable. As noted above, the skin 10 is intended for use in an acoustic panel, and as such will be assembled with an open-cell core (not shown) disposed between the acoustic skin 10 and a backing skin (not shown). The acoustic skin 10 can be used with entirely conventional cores and backing skins, including such known materials as open-cell foam or honeycomb metallic or composite materials for the core and metallic or composite sheets for the backing skin. As such the core and backing skin to which the acoustic skin 10 is to be attached (for example, by adhesive bonding) will not be described or discussed in any further detail here.

According to a preferred aspect of the invention, the holes 12 are formed by an electron beam (EB) drilling process configured for rapidly drilling large numbers of small diameter holes 12 in a well-defined hole pattern 14. As known in the art, EB drilling entails focusing a highly-concentrated energized electron beam onto a substrate surface to vaporize the substrate material at the point of impact. Depending on the EB drilling equipment used, multiple holes 12 can be sequentially formed be deflecting the electron beam. The holes 12 can be formed to have diameters of less than 0.03 inch (about 0.75 mm) and as small as about 0.001 inch (about 25 micrometers), which is far less than the more conventional hole diameter range of about 0.03 to about 0.06 inch (about 0.75 to about 1.5 mm). However, particularly suitable hole diameters are believed to be greater than 0.020 inch (about 0.5 mm) up to about 0.045 inch (about 1.1 mm). Benefits of minimizing the diameter of the holes 12 generally include lower sensitivity to grazing flow effects, lower noise generated as a result of the skin 10 behaving as a resonator, lower skin friction drag, improved surface appearance, and impeded water ingress into the core.

Figure 3:
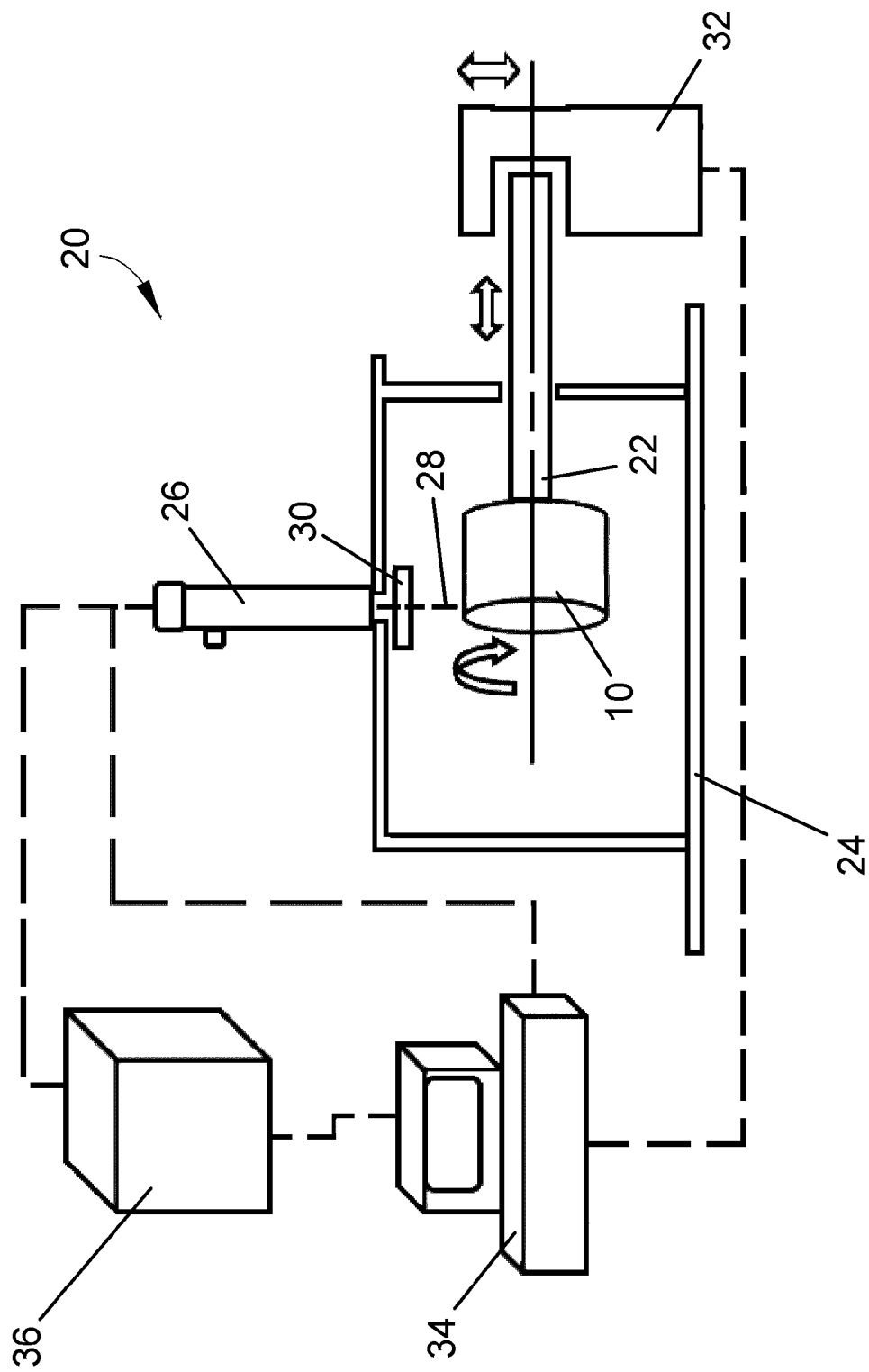
FIG. 3 schematically represents an electron beam drilling system suitable for performing an electron beam drilling operation in accordance with an embodiment of this invention.

To fit the required arcuate contour of a nacelle, the skin 10 is likely to have a radius of curvature of, for example, about twelve to sixty inches (about 30 to about 150 cm) or more. According to a preferred aspect of the present invention, the acoustic skin 10 is formed to have its requisite curved shape prior to forming the holes 12, and the holes 12 are not parallel to each other but instead are oriented to have an axis roughly normal to the surface 16 of the acoustic skin 10, preferably within about five degrees of perpendicular to the skin surface 16. As such, the holes 12 cannot be drilled with a tool whose transverse movements are limited to a simple two-dimensional pattern, but instead further require the capability of maintaining an orientation roughly normal to the skin surface 16. Preferred EB drilling processes and systems employed by this invention utilize computer controls to not only control process parameters that determine the hole size, hole cross-section, drilling speed, etc., but also orientation of the skin 10 to the electron beam gun that generates the electron beam used in the drilling process. FIG. 3 schematically represents an EB drilling system 20 suitable for this purpose, in which the skin 10 is loaded on a rotating mandrel 22 (such as a fixtured shaft or spindle) and positioned in an evacuated (vacuum) chamber 24 within which the EB drilling process is performed. The rotation, translation and orientation of the skin 10 within the chamber 24 is determined with a positioning drive system 32, such as a five-axis positioning drive system controlled by a computer 34 (or other control device). A power supply 36 delivers power to an EB gun 26, whose operation can be controlled with the computer 34 in relation to the drive system 32 to direct an electron beam 28 roughly along a radial of the curvature of the skin 10. The path that the beam 28 travels to the skin 10 can be precisely controlled with a deflection coil 30 in accordance with known practices. In combination, the rotation and translation of the mandrel 22 and the deflection of the beam 28 are controlled to drill holes 12 through the skin 10 at desired locations. Deflection of the beam 28 can be rapidly and precisely performed to control the placement of the holes 12 at rates far exceeding mechanical drilling rates. Process parameters that are controlled to determine the hole size, hole cross-sectional shape, drilling speed, etc., include energy (pulse time and beam current) and the position and manipulation (rotational and/or translational speeds) of the skin 10 in the vacuum chamber 24.

Drilling acoustic skins 10 by the electron beam process described above provides several advantages over conventional punching and mechanical drilling processes. A general advantage is the ability to rapidly drill the holes 12 approximately normal to the contoured surface 16 of the skin 10 at very high rates, for example, up to two hundred holes per second or more. A more particular advantage is that, by forming the skin 10 prior to drilling the holes 12, the formed skin 10 is produced with holes 12 having essentially the same cross-sectional shape. Because the skin 10 does not undergo deformation after the holes 12 are drilled, the holes 12 do not elongate in a nonuniform manner, with the result that the holes 12 consistently have the same cross-sectional shape, for example, a circular, elliptical, or slot shapes transverse to the axes of the holes 12 (and as visible at the surface 16 of the skin 10). Additionally, various longitudinal cross-sections can be generated with an EB beam, including the rectilinear shape shown in FIG. 2, as well as tapered, bell-shapes, and hourglass-shapes. However, EB drilling will typically create a slightly larger entrance area to the hole 12 as a result of the initial beam pulsing. Electron beams are also capable of drilling very small holes, for example, on the order of about 0.001 inch (about 25 micrometers), which cannot be economically produced by conventional mechanical punching and drilling methods.

In investigations leading to the present invention, various aluminum alloy test specimens and acoustic skins were processed as described above to have holes with diameters in a range of about 0.035 to about 0.055 inch (about 0.9 to about 1.4 mm). One such specimen is shown in FIG. 1 as having equi-spaced holes with diameters of about 0.055 inch (about 1.4 mm) and center-to-center spacings of about 0.128 inch (about 3.25 mm). Because the holes were formed after shaping the skin, the cross-sectional shapes of the holes are substantially circular and the same throughout. Examination of the hardware for metallurgical and mechanical properties indicated that the process is capable of producing acoustic skins whose mechanical properties may meet or exceed those of conventionally drilled skins. For example, because the holes are round instead of oblong (as would result from conventionally performing the forming operation after drilling the holes), the skins are capable of exhibiting tensile strength and edge-wise compression strength that are roughly the same in both the hoop and axial directions. The holes were also free of tiny fissures and cracks often observed in conventionally formed acoustic hardware.

Notably, because an acoustic skin is preformed to the desired nacelle shape prior to EB drilling, the holes can be selectively located where required for the particular nacelle application, whereas other surface regions of the skin can be left undrilled to promote the structural integrity of the skin and the acoustic panel in which the skin is assembled. An additional benefit of this process is the ability to economically alter the acoustic treatment hole pattern (14 in FIG. 1) with respect to acoustic waves within the nacelle structure. In other words the hole pattern 14, as defined by the size, shape and spacing of the holes 12, may be altered to tune a specific area or areas of a flow path surface to attenuate specific frequency bands of noise.

While the invention has been described in terms of specific embodiments, it is apparent that other forms could be adopted by one skilled in the art. For example, the physical configuration of the acoustic skin could differ from that shown, and materials other than those noted could be used. Therefore, the scope of the invention is to be limited only by the following claims.

The invention claimed is:

1. A process of producing multiple through-holes in an acoustic skin of an acoustic panel, the process comprising:
   deforming a sheet member to have an arcuate shape with an arcuate surface;
   mounting, orienting, translating and rotating the arcuate-shaped sheet member on a mandrel relative to an electron beam gun;
   operating a multiple-axis positioning drive system to determine orientation, translation and rotation of the arcuate-shaped sheet member relative to the electron beam gun; and then
   while rotating the arcuate-shaped sheet member, operating the electron beam gun to direct an electron beam at the arcuate surface of the rotating arcuate-shaped sheet member and deflecting the electron beam toward multiple locations on the arcuate surface to produce the multiple through-holes through the arcuate-shaped sheet member in a defined hole pattern and thereby yield a perforated arcuate-shaped acoustic skin having an arcuate flow path surface defined by the arcuate surface of the arcuate-shaped sheet member, the orientation, translation and rotation of the arcuate-shaped sheet member being controlled so that each of the holes has an axis substantially normal to the arcuate flow path surface of the perforated arcuate-shaped acoustic skin sheet and along a radial of a curvature of the perforated arcuate-shaped acoustic skin, and the orientation, translation and rotation of the arcuate-shaped sheet member being further controlled so that the size, shape and spacing of the holes are intentionally altered within the hole pattern to tune at least one specific area of the arcuate flow path surface to attenuate specific frequency bands of noise with the perforated arcuate-shaped acoustic skin.

2. The process according to claim 1, wherein the sheet member is formed of an aluminum alloy.

3. The process according to claim 1, wherein the holes are not subjected to elongation in a nonuniform manner after the holes are produced, and the holes have the same cross-sectional shape transverse to the axes thereof.

4. The process according to claim 1, wherein each hole has a longitudinal cross-section shape chosen from the group consisting of rectilinear, tapered, bell, and hourglass shapes.

5. The process according to claim 1, wherein the holes have diameters of about 0.5 to about 1.1 millimeters.

6. The process according to claim 1, wherein the transverse and longitudinal cross-sectional shapes of the holes are substantially the same throughout the perforated arcuate-shaped arcuate sheet.

7. The process according to claim 1, wherein the holes are selectively located in first regions of the arcuate-shaped sheet member and selectively omitted in second regions of the arcuate-shaped sheet member to promote the structural integrity of the perforated arcuate-shaped acoustic skin.

8. The process according to claim 1, the process further comprising bonding the perforated arcuate-shaped acoustic skin to a first surface of a core and bonding a backing sheet to an oppositely-disposed second surface of the core to produce the acoustic panel.

9. The process according to claim 8, further comprising installing the acoustic panel on an aircraft engine.

10. The process according to claim 9, wherein the acoustic panel is installed as part of an engine nacelle of the aircraft engine.

11. The process according to claim 9, wherein the acoustic panel is installed on a duct sidewall of the aircraft engine.

12. A process of producing an acoustic panel of an aircraft engine, the process comprising:
    deforming a metallic sheet member to have an arcuate shape with an arcuate surface;
    mounting, orientation, translating and rotating the arcuate-shaped sheet member on a mandrel within an evacuated chamber and relative to an electron beam gun;
    operating a five-axis positioning drive system to determine orientation, translation and rotation of the arcuate-shaped sheet member relative to the electron beam gun; and then
    while rotating the arcuate-shaped sheet member, operating the electron beam gun to direct an electron beam at the arcuate surface of the rotating arcuate-shaped sheet member and deflecting the electron beam toward multiple locations on the arcuate surface to produce multiple through-holes through the arcuate-shaped sheet member in a defined hole pattern and thereby yield a perforated arcuate-shaped acoustic skin having an arcuate flow path surface defined by the arcuate surface of the arcuate-shaped sheet member, the orientation, translation and rotation of the arcuate-shaped sheet member being controlled so that each of the holes has an axis substantially normal to the arcuate flow path surface of the perforated arcuate-shaped acoustic skin and along a radial of a curvature of the perforated arcuate-shaped acoustic skin, and the orientation, translation and rotation of the arcuate-shaped sheet member being further controlled so that the size, shape and spacing of the holes are intentionally altered within the hole pattern to tune at least one specific area of the arcuate flow path surface to attenuate specific frequency bands of noise with the perforated arcuate-shaped acoustic skin; and then bonding the perforated arcuate-shaped acoustic sheet to a first surface of a core and bonding a backing sheet to an oppositely-disposed second surface of the core to produce the acoustic panel.

13. The process according to claim 12, wherein the sheet member is formed of an aluminum alloy.

14. The process according to claim 12, wherein the holes are not subjected to elongation in a nonuniform manner after the holes are produced, and the holes have the same cross-sectional shape transverse to the axes thereof.

15. The process according to claim 12, wherein each hole has a longitudinal cross-section shape chosen from the group consisting of rectilinear, tapered, bell, and hourglass shapes.

16. The process according to claim 12, wherein the holes have diameters of about 0.5 to about 1.1 millimeters.

17. The process according to claim 12, wherein the transverse and longitudinal cross-sectional shapes of the holes are substantially the same throughout the perforated arcuate-shaped acoustic skin.

18. The process according to claim 12, wherein the holes are selectively located in first regions of the arcuate-shaped sheet member and selectively omitted in second regions of the arcuate-shaped sheet member to promote the structural integrity of the perforated arcuate-shaped acoustic skin.

19. The process according to claim 12, further comprising the step of installing the acoustic panel on the aircraft engine.

* * * * *